United States Patent [19]
Arnold

[11] 3,744,822
[45] July 10, 1973

[54] APPARATUS FOR A SEALING EXTERNAL SURFACE OF A TUBULAR MEMBER

[75] Inventor: James F. Arnold, Baytown, Tex.

[73] Assignee: Hydro Tech Services, Inc., Houston, Tex.

[22] Filed: Jan. 15, 1971

[21] Appl. No.: 106,726

[52] U.S. Cl. ................ 285/18, 138/99, 285/322, 285/348, 285/373, 285/DIG. 21
[51] Int. Cl. ............................................. F16l 35/00
[58] Field of Search ................ 285/18, 24, 27, 94, 285/101, 105, 165, 298, 302, 308, 322, 323, 373, 414, 421, 348, 343, DIG. 21, 15; 138/99; 166/0-6

[56] References Cited
UNITED STATES PATENTS

| | | | |
|---|---|---|---|
| 2,983,477 | 5/1961 | Merrill | 137/318 X |
| 3,240,227 | 3/1966 | Burkholder | 137/318 |
| 3,209,829 | 10/1965 | Hueber | 285/145 X |
| 3,466,069 | 9/1969 | Hoke et al. | 285/373 X |
| 3,298,699 | 1/1967 | Hall | 285/18 X |
| 1,455,731 | 5/1923 | Kelly | 285/146 X |
| 3,142,500 | 7/1964 | Wesseler | 285/342 X |
| 3,321,217 | 5/1967 | Ahlstone | 285/315 X |
| 3,333,870 | 8/1967 | Wotkins | 285/315 X |
| 3,376,056 | 4/1968 | Linstead | 285/421 X |
| 3,393,926 | 7/1968 | Arnold | 285/18 |
| 3,598,429 | 6/1971 | Arnold | 285/18 |

*Primary Examiner*—Dave W. Arola
*Attorney*—Paul E. Harris, Lee R. Larkin and Marcus L. Thompson

[57] ABSTRACT

A segmented housing adapted for clamping about a tubular member, with a resilient packer mounted about the tubular member and within the housing. A fluid actuated piston carried by the housing is adapted to apply an axial engaging force to the packer to sealingly engage it with the tubular member. Also disclosed are circumferentially disposed slips mounted in the housing and arranged to move radially into engagement with the tubular member in response to the axial piston force. A plurality of longitudinally spaced packers and slips and longitudinal inter-packer seals are provided in some embodiments which are useful for clamping about an opening in a tubular member or for use with a tapping apparatus to cut openings in pressurized pipes.

8 Claims, 9 Drawing Figures

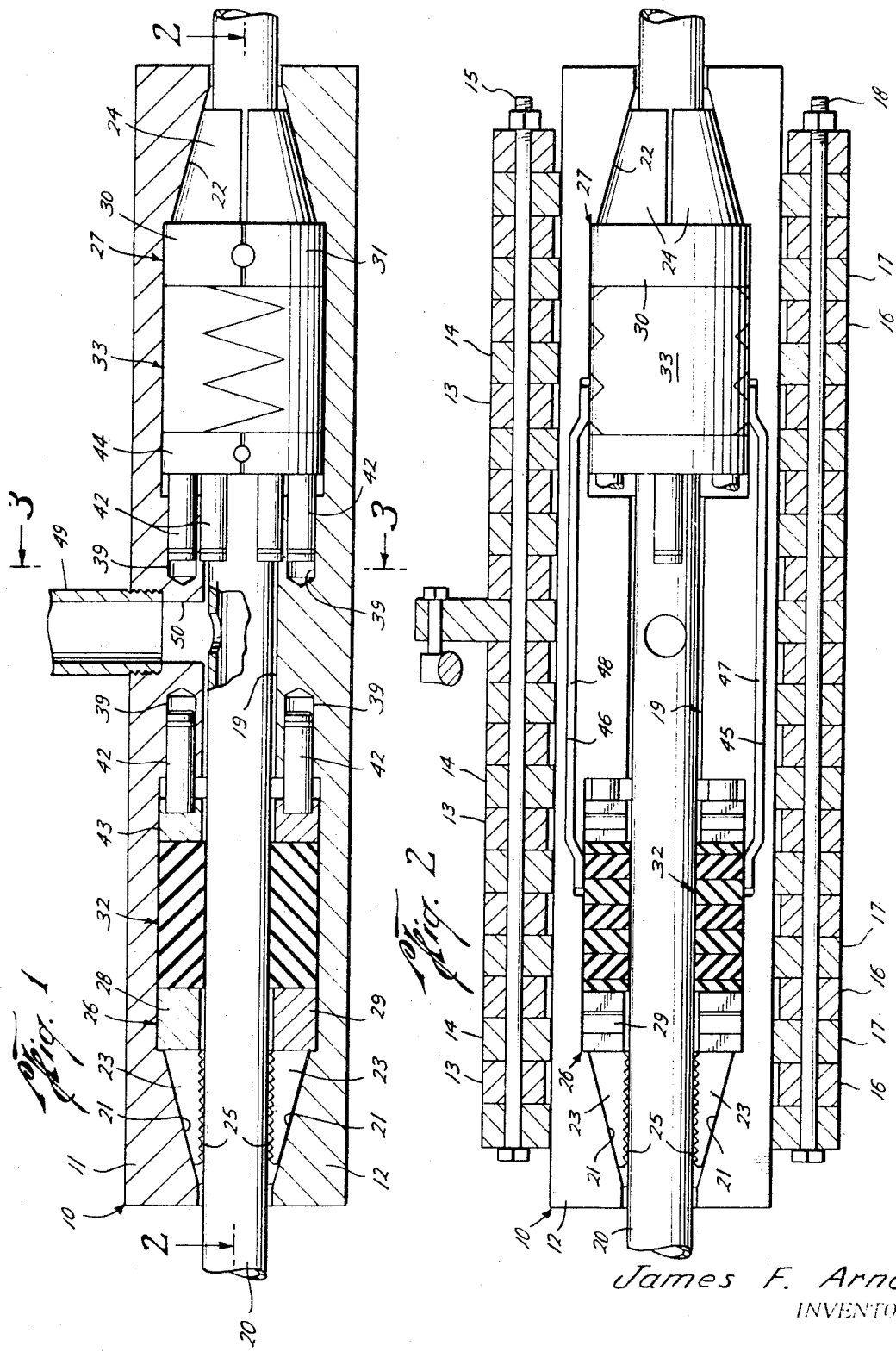

James F. Arnold
INVENTOR

BY Lee R. Larkin
ATTORNEYS

James F. Arnold
INVENTOR

BY Lee R. Larkin
ATTORNEYS

James F. Arnold
INVENTOR

BY Lee R. Larkin
ATTORNEYS

APPARATUS FOR A SEALING EXTERNAL SURFACE OF A TUBULAR MEMBER

BACKGROUND OF THE INVENTION

1. Field of the Invention

Apparatus for clamping about a tubular member and sealing a portion of the external surface thereof.

2. Description of the Prior Art

In several industries, and particularly in the oil and gas industry, it is frequently necessary to tap into a pipe carrying a fluid under pressure. Many devices are available in the art for performing such a "hot" tap. However, all of the known tapping devices are designed to be operated within a pressure tight riser tube which is welded onto the pipe to be tapped. Conventionally these mechanically or hydraulically actuated drills cut a coupon or disc out of the wall of the pipe.

In many of these hot tapping situations, such as in the case of a submerged pipe or when dealing with a pipe pressurized with a flammable or explosive fluid, it can be extremely dangerous and/or expensive to weld a riser tube onto the pipe to be tapped.

Another similar pipeline servicing problem arises when it becomes necessary to repair a crack or break in a pressurized pipe or a pipe submerged in water. Conventionally the break is welded closed. Various devices have been developed for use in situations where welding would be hazardous or unduly expensive. However, these devices must be mechanically assembled and sealed about the cracked pipe by one or more experienced workers. The cost of using such devices can be relatively high when the cracked pipe is in a fairly unaccessible location, such as underwater.

SUMMARY OF THE INVENTION

The apparatus of this invention is designed for use in closing breaks in tubular members and for use with hot tapping devices and includes a segmented housing adapted for clamping about a tubular member. It includes a resilient packer adapted for mounting about the tubular member and within the housing, and means connected to the housing for applying an axial pressure to the packer to cause the packer to expand radially inward into engagement with the external surface of the tubular member. The pressure applying means includes at least one fluid pressure actuated piston.

Preferably the pressure applying means includes a plurality of longitudinally aligned cylinders provided in the housing, with a piston slidably positioned in each cylinder and arranged to exert an axial force upon the packer.

The packer may be formed from a plurality of resilient rings arranged for parallel adjacent mounting about the tubular member or may be formed from a tubular resilient member which is longitudinally slit in one or more places.

An alternate preferred combination for the invention includes a segmented housing arranged for clamping about a tubular member. It includes a pair of resilient packers adapted for mounting about the tubular member at longitudinally spaced apart points within the housing. A plurality of tapered slips are mounted in the housing and arranged to move radially into engagement with the tubular member, and means are provided for applying an engaging force to the packers and slips. This combination of the invention preferably includes means for providing a longitudinal seal between the packers at the adjacent surfaces of the segments of the housing.

The means for applying an engaging force to the packers and slips preferably includes a plurality of cylinders provided in the housing adjacent each of the packers and a piston slidably positioned in each cylinder.

BRIEF DESCRIPTION OF THE DRAWINGS

FIG. 1 is a partial central sectional view of one embodiment of the invention.

FIG. 2 is a partial sectional view taken along 2—2 of FIG. 1.

DESCRIPTION OF THE PREFERRED EMBODIMENT

Figure 3:
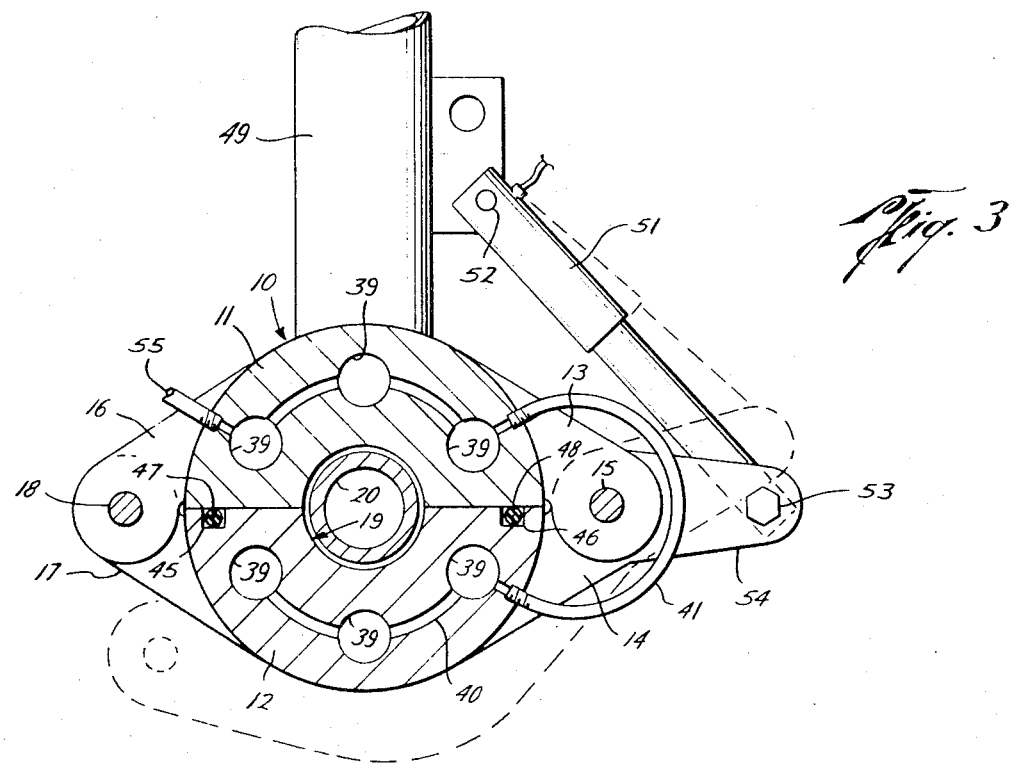
FIG. 3 is a cross-sectional view taken generally along 3—3 of FIG. 1.

One embodiment of this invention preferred by the inventor is illustrated in FIGS. 1–3. Referring to those figures, the apparatus of this embodiment includes an elongate generally cylindrical housing 10 formed from mating semi-cylindrical upper housing segment 11 and lower housing segment 12, which segments are best seen in FIG. 3. Although illustrated and described as being formed of two segments, housing 10 could be formed of any desired number of mating partial cylindrical housing segments, as described below.

The segments 11 and 12 of housing 10 are longitudinally pivotally connected together so that housing 10 may be laterally opened for clamping about a tubular member, as described below. This pivotal connection includes top hinge pad eyes 13 extending generally radially from segment 11, mating bottom hinge pad eyes 14 extending generally radially from segment 12, and a hinge pin 15 inserted through eyes 13 and 14, as shown in FIGS. 2 and 3. Similar mating and generally radially extending upper closure pads 16 and lower closure pads 17 are provided on housing segments 11 and 12, respectively, on the opposite side of housing 10 from the pivotal connection. Pads 16 and 17 are arranged to receive a retaining pin 18 therethrough and together provide means for retaining housing 10 in the closed position about a tubular member, as described below.

The internal configuration of this embodiment is best seen in FIGS. 1 and 2. As shown, housing 10 is provided with a longitudinal axial opening (generally designated by the numeral 19) therethrough arranged to receive a tubular member such as pipe 20. The left and right outer end portions of opening 19 in housing 10 are formed with inwardly directed frusto-conical slip seats 21 and 22, respectively, which are arranged to receive tapered slips 23 and 24. Slips 23 and 24 are formed from frusto-conical segments arranged to mate with seats 21 and 22, and the inner surface of the slips is provided with circumferential wickers or gripping teeth 25 arranged to engage pipe 20.

Compression rings 26 and 27 are provided adjacent the inner ends of slips 23 and 24 and are arranged for axial sliding movement along pipe 20 within housing 10. In the embodiment shown, rings 26 and 27 are each formed in upper and lower mating segments (28, 29 and 30, 31), adapted for positioning in each half of housing 10. If a larger number of housing segments were used, rings 26 and 27 could be divided into a corresponding larger number of mating segments. The adjacent surfaces of each segment of rings 26 and 27 are formed in a matching tongue and groove manner, as shown, in order to increase the mechanical strength and axial force transfer capability of the assembled rings.

Figure 4:
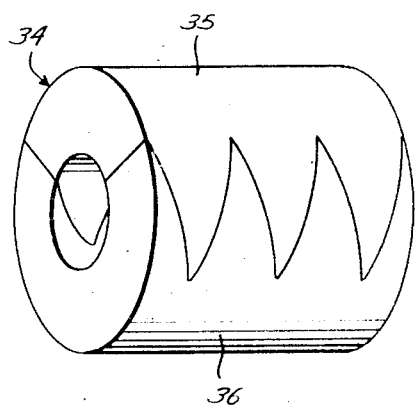
FIG. 4 is an isometric view of a first packer embodiment.
Figure 5:
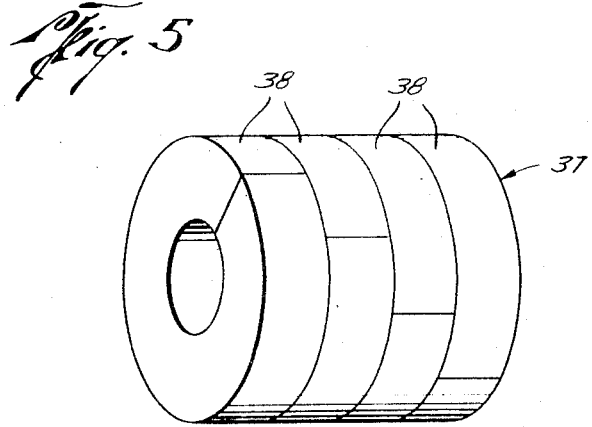
FIG. 5 is an isometric view of a second packer embodiment.

Generally cylindrical packers 32 and 33 are provided in housing 10 about pipe 20 adjacent the inner ends of rings 26 and 27. Packers 32 and 33 are formed of a resilient material such as rubber, neoprene, or the like, which will deform radially when subjected to an axially compressive force, and provide means for creating a pressure tight seal between the outside surface of pipe 20 and the inside of housing 10. Packers 32 and 33 may assume any of several conventional shapes. Referring to FIG. 4, for example, a generally tubular packer 34 formed of mating material partial cylindrical segments 35 and 36 could be used as packers 32 and 33. Similarly, packer 37 formed of a plurality of adjacent parallel split rings 38, as shown in FIG. 5, could be used. Other desired packer configurations similarly may be used, as long as the packer is arranged for axial compression and radially inward deformation into sealing engagement with the outer surface of pipe 20.

As shown in FIGS. 1 and 3, the center portion of each segment of housing 10 is provided with two groups of three longitudinally aligned cylinders 39 which open towards packers 32 and 33. Referring to FIG. 3, an internal fluid manifold 40 interconnects each group of cylinders 39 and a flexible external fluid manifold 41 communicates with cylinders 39 and provides means for inserting a pressurized fluid into cylinders 39. Each of cylinders 39 has mounted therein an axially slidable piston 42, one end of which is arranged to exert an axial force upon packers 32 and 33. Split compression rings 43 and 44 are positioned between pistons 42 and packers 32 and 33, respectively, and act to evenly distribute the piston forces against the axially inward ends of packers 32 and 33.

Referring to FIGS. 2 and 3, the top or mating surface of the lower segment 12 of housing 10 is provided with seal recesses 45 and 46 extending generally longitudinally between packers 32 and 33. Positioned within recesses 45 and 46 are longitudinal seals 47 and 48, respectively, of generally circular cross-section, the diameter of which is slightly greater than the depth of the recesses. When housing 10 is closed, the lower or mating surface of upper housing segment 11 contacts and compresses seals 47 and 48, providing a longitudinal pressure tight seal between packers 32 and 33 at the adjacent mating surfaces of segments 11 and 12. Packers 32 and 33 and seals 47 and 48 act together to prevent loss of pressurized fluid from the central portion of housing 10, which fluid could originate, for example, in a break or crack in pipe 20 between packers 32 and 33. If more than two housing segments were used, similar longitudinal seals would be used between the mating adjacent surfaces of each segment.

The apparatus thus far described is suitable for use in closing off a break or crack in a tubular member by clamping housing 10 about the tubular member so that the break or crack falls between packers 32 and 33, and thereafter pressurizing cylinders 39. Although less economical, the above apparatus alternatively could be used to seal a small break or crack by positioning either packer 32 or packer 33 over the crack and then pressurizing the corresponding group of cylinders 39.

As mentioned above, this apparatus additionally may be used when it is necessary to tap into a pressurized pipe. For that application, a hot tap nipple or riser pipe 49 is secured to housing 10 between packers 32 and 33. Pipe 49 may be adapted to receive any of the several conventional hot tap drilling devices available. Housing 10 is provided with an opening 50 which communicates between pipe 20 and the bore of pipe 49, allowing the tapping apparatus (not shown) to engage pipe 20.

Referring to FIG. 3, means for hydraulically clamping housing 10 about pipe 20 are provided which includes an hydraulically actuated clamping ram 51. The upper end of ram 51 is connected by pivot 52 to riser pipe 49 (and thereby to upper housing segment 11) and the lower end of ram 51 is connected by pivot 53 and arm 54 to lower housing segment 12. Ram 51 is of the double acting type, and with the above arrangement, extension of ram 51 closes housing 10, while contraction of ram 51 will open housing 10 to allow installation or removal of housing 10 from a tubular member such as pipe 20.

In operation, retaining pin 18 is removed from closure pads 16 and 17 and ram 51 is actuated to the retracted position. With packers 32 and 33, such as packer 34 illustrated in FIG. 4 retained in housing 10, housing 10 is positioned about pipe 20 and ram 51 is actuated to the extended position. The apparatus is then clamped about pipe 20 as shown in FIGS. 1-3. Thereafter, pin 18 is inserted into pads 16 and 17. A fluid pressure is then injected into cylinders 39 through manifolds 40 and 41 from pressure inlet line 55 shown in FIG. 3, thereby causing slips 23 and 24 and packers 32 and 33 to become engaged about pipe 20. Pressure inlet line 55 may be arranged to communicate a fluid pressure to all of cylinders 39, as shown, or a second pressure inlet line (not shown) may be provided so that the cylinders at each end of housing 10 may be actuated independently.

Figure 6:
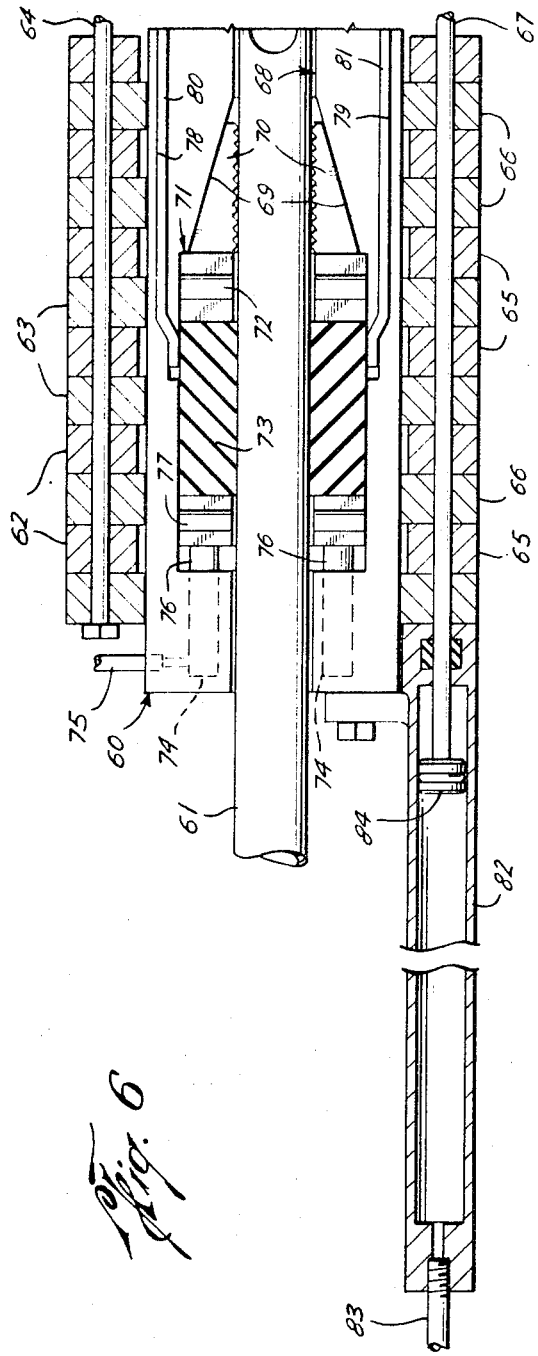
FIG. 6 is a central sectional view of a portion of a second embodiment of the invention.

Referring to FIG. 6 there is illustrated in partial cross-section the left hand one-half of a second embodiment of the apparatus of this invention. This embodiment is similarly a housing 60 arranged for clamping about a tubular member, such as pipe 61, and similarly includes hinge pad eyes 62 and 63, hinge pin 64, closure pads 65 and 66, retaining pin 67, and a generally longitudinal axial opening 68 therethrough. In this embodiment a frusto-conical outwardly directed slip seat 69 is formed in the inner portion of opening 68 and mating tapered slips 70 are slidably positioned therein. A compression ring 71 is provided adjacent the outer end of slips 70 and is arranged for axial sliding movement in housing 60 along pipe 61. As with the above described first embodiment, ring 71 is formed in upper (not shown) and lower 72 mating halves so that each segment of housing 60, when opened, will carry a portion of ring 71.

A resilient packer 73 is provided in housing 60 about pipe 61 adjacent the left end of ring 71. As described above, packer 73 may be formed as illustrated in FIGS. 4 or 5, or may constructed in other similar shapes.

The left end of housing 60 has a plurality of cylinders 74 formed therein which are coupled together by a manifold (not shown) and arranged to receive a fluid pressure through pressure inlet line 75. A piston 76 is disposed in each of cylinders 74 and is arranged for axial movement in response to a fluid pressure within cylinders 74. Interposed between the right end of pistons 76 and the left end of packer 73 is a second split compression ring 77 arranged to distribute the forces from pistons 76 to packer 73 and to slips 70.

The right one-half of this apparatus (not shown) is constructed as the mirror image of the portion shown in FIG. 6, so that housing 60 would additionally have a second group of cylinders 74 at the right end thereof, and similarly is provided with another set of slips, compression rings, and a second packer. The illustrated lower segment of housing 60 is provided with longitudinal seal recesses 78 and 79 extending from packer 73 to the second packer (not shown) and seals 80 and 81 of generally circular cross-section are respectively positioned therein and arranged to effect longitudinal interpacker closure of housing 60, as described above with reference to FIGS. 1–3.

This embodiment is also provided with a retaining pin ram cylinder 82 which is connected to the left end of housing 60 and is arranged coaxially with retaining pin 67. Cylinder 82 is of sufficient length to accept pin 67 when it is withdrawn from pads 65 and 66, and is provided with a fluid inlet 83 at the left end thereof. A piston 84 is slidably positioned within cylinder 82 and is connected to the left end of pin 67 and arranged for movement therewith. In operation the apparatus is clamped about pipe 61 and cylinder 82 is pressurized to insert pin 67 into pads 65 and 66. A pressurized fluid is then inserted into cylinders 74 through line 75. This pressure causes rightward movement of pistons 76 and ring 77, engaging packer 73 and slips 70 with the outer surface of pipe 61.

When provided with a hydraulic clamping ram such as ram 51 illustrated in FIG. 3, this embodiment of the apparatus may be clamped, retained and engaged about pipe 61 entirely hydraulically, and therefore lends itself for use where a completely remotely controlled operation is desired. Although not illustrated or described as a part of the other embodiments of the apparatus of this invention, cylinder 82 and piston 84 illustrated in FIG. 6 could be used with any of the embodiments of this apparatus, if desired, to achieve a totally remotely operated capability.

Figure 7:
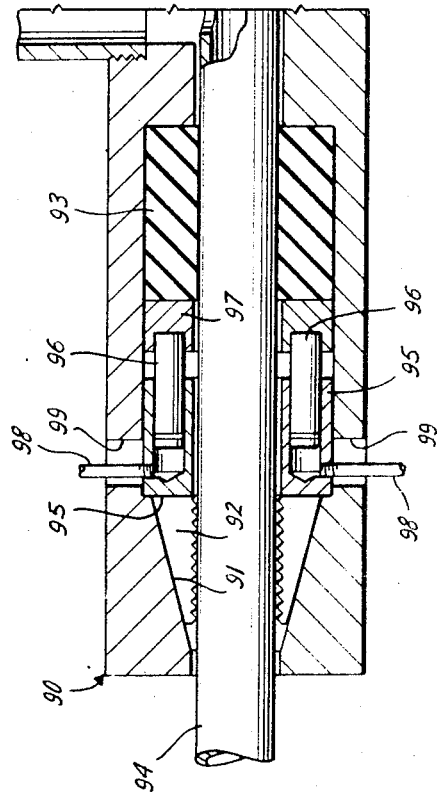
FIG. 7 is a central sectional view of a portion of a third embodiment of the invention.

Referring to FIG. 7, the left one-half of still another embodiment of the apparatus of this invention is illustrated which is similar in construction to that shown in FIGS. 1–3 above. In this embodiment the left end of housing 90 is provided with an inwardly facing frustoconical tapered seat 91 containing mating slips 92, and the inward portion of housing 90 is provided with a packer 93 arranged for sealing engagement with a pipe 94 inserted therein. Instead of the generally centrally disposed cylinders 39 of the FIGS. 1–3 embodiment, this embodiment utilizes slidable or "floating" cylinder and piston assemblies to apply an actuating force to slips 92 and packer 93.

Referring to FIG. 7, a plurality of axially slidable cylinders 95 are provided adjacent the right end of slips 92 and are arranged to open towards packer 93. A piston 96 is slidably positioned in each of cylinders 95, and the force of rightward movement of pistons 96 is distributed to packer 93 through a split compression ring 97. Means for injecting a fluid pressure into cylinders 95 is provided in the form of pressure inlet lines 98. A clearance slot 99 is provided in housing 90 adjacent each of lines 98 so that cylinders 95 will be free for limited axial movement during the setting operation.

In operation, this apparatus is clamped and retained about pipe 94 by means (not shown) similar to that described above with respect to previously described embodiments. A pressurized fluid is then injected into cylinders 95 through lines 98, causing leftward movement of cylinders 95 and engagement of slips 92, and simultaneous rightward movement of pistons 96 and engagement of packer 93. Although not illustrated, the other one-half of this apparatus is a mirror image of the portion illustrated and is similarly actuated to engagement with pipe 94.

Figure 8:
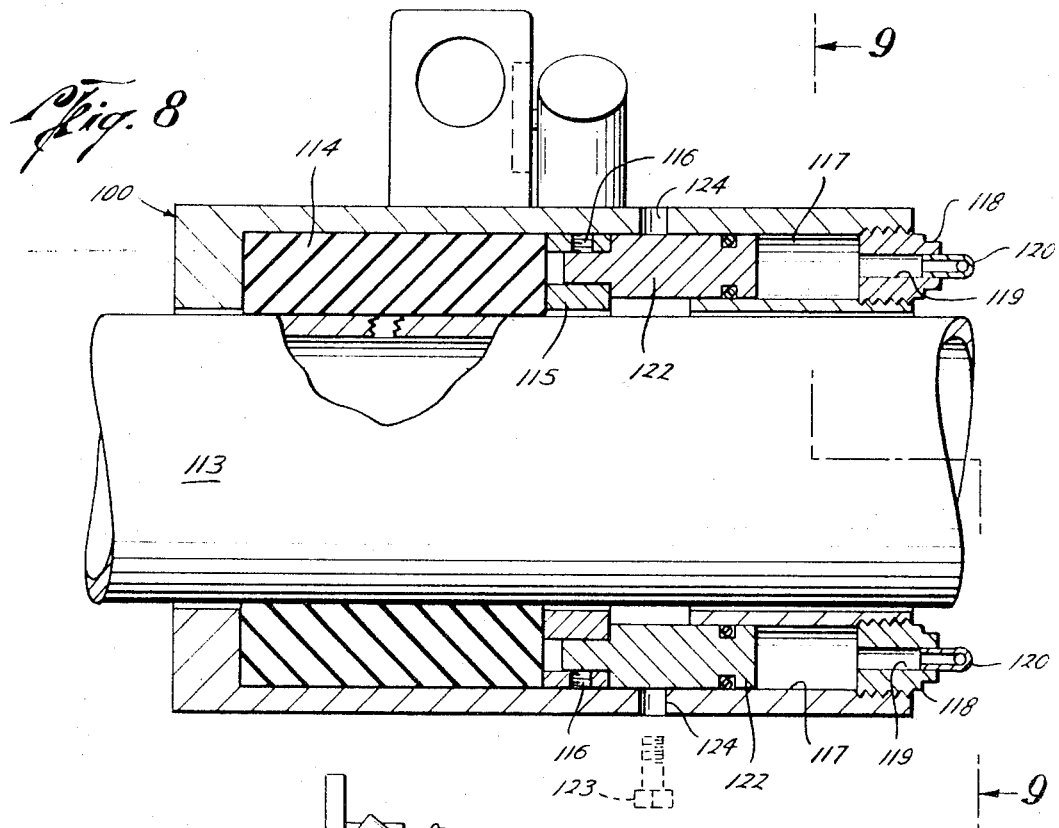
FIG. 8 is a central sectional view of a portion of another embodiment of the invention.
Figure 9:
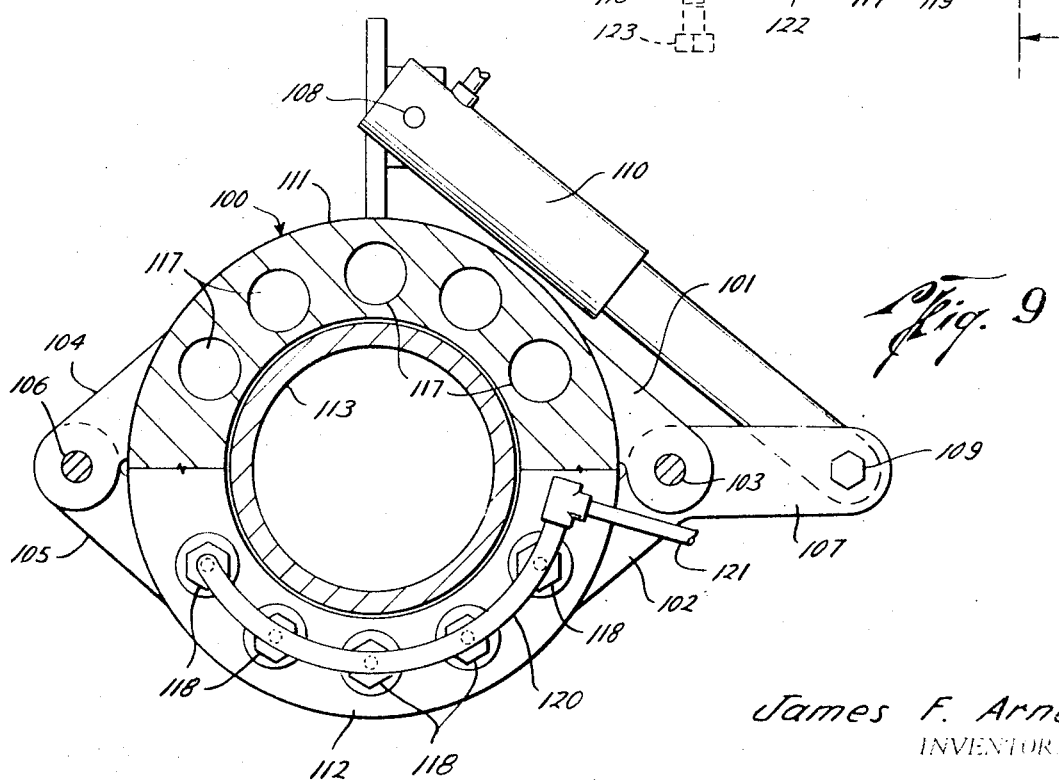
FIG. 9 is a partial cross-sectional view taken generally along 9—9 of FIG. 8.

A still further embodiment of this invention, suitable for use in sealing a crack or other opening in a tubular member, is illustrated in FIGS. 8 and 9. In this embodiment a segmented housing 100 is similarly provided with hinge eyes 101 and 102, hinge pin 103, closure pads 104 and 105, retaining pin 106, arm 107, pivots 108 and 109, and hydraulic ram 110, all of which provide means for closing upper segment 111 and lower segment 112 of housing 100 about pipe 113, as described above with reference to previous embodiments.

Referring to FIG. 8, a generally tubular packing 114 is confined about pipe 113 within housing 100 and is arranged to be radially deformed into sealing engagement with pipe 113. Packing 114 may be arranged in the form illustrated in FIGS. 4 and 5, and described above, or may assume any similar tubular shape.

A generally cylindrical compression ring 115 is slidably positioned within housing 100 adjacent the right end of packing 114 and is arranged to transmit an axial force to packing 114. Ring 115 is formed in two semicylindrical mating halves so that it may be conveniently opened and fitted over pipe 113 when the apparatus is installed. Each half of ring 115 is provided with a radially directed threaded hole 116, arranged to receive a retainer screw as described below.

As shown in FIGS. 8 and 9, the right end of housing 100 has a plurality of longitudinally aligned cylinders 117 provided therein with the right end of each of cylinders 117 being closed by threaded plugs 118. An axial opening 119 through each of plugs 118 communicates with cylinders 117. Means for communicating a fluid pressure to cylinders 117 is provided in the form of rigid manifolds 120 connected to plugs 118 and by interconnecting flexible manifold 121.

A piston 122 is slidably positioned within each of cylinders 117 and is arranged to contact compression ring 115 and to thereby impart an axial force to packing 114. Prior to installation of this apparatus, pistons 122 and compression ring 115 are retained to the right and away from packing 114 by screws 123 which are inserted through openings 124 in housing 100 into threaded holes 116 in ring 115.

In operation, the apparatus of FIGS. 8–9 is initially opened using hydraulic ram 110 and is positioned about pipe 113. Ram 110 is then actuated to close the apparatus about pipe 113 and retaining pin 106 is inserted into closure pads 104 and 105. After removing screws 123, a pressurized fluid is transmitted to cylinders 117 through manifolds 120 and 121, causing leftward engaging movement of pistons 122 and ring 115. This movement axially compresses packing 114, causing it to deform radially inward into sealing engagement with pipe 113.

If a permanent installation is desired when installing any of the foregoing devices, a hardenable fluid such as an epoxy resin may be used as the piston pressurizing fluid.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for sealing a portion of the external surface of a tubular member, the combination comprising:
   a longitudinally segmented housing arranged for clamping about a tubular member;
   means connected to said housing for securing said housing in clamped position about said tubular member upon actuation thereof;
   at least one resilient packer mounted in said housing and adapted to sealingly engage a full circumferential portion of the external surface of said tubular member and to seal at least portions of the longitudinal spaces between the segments of said housing upon actuation thereof;
   a plurality of longitudinally aligned hydraulic cylinder and piston means mounted in said housing for applying an axial force to said packer to thereby axially compress and radially deform said packer into sealing engagement between said housing and said external surface of said tubular member and to seal said portions of said longitudinal spaces;
   and, means provided in said housing for applying hydraulic pressure to said piston means for actuation thereof.

2. The invention as claimed in claim 1 including:
   hinge means for hingedly connecting said segments of said housing; and
   means for hydraulically closing said segmented housing about said tubular member.

3. The invention as claimed in claim 1 including:
   a plurality of tapered slips slidably mounted in said housing and arranged to move into engagement with said tubular member in response to actuation of said piston means.

4. In apparatus for sealing a portion of the external surface of a tubular member, the combination comprising:
   a longitudinally segmented housing arranged for clamping about a tubular member;
   means connected to said housing for securing said housing in clamped position about said tubular member upon actuation thereof;
   a pair of resilient packers mounted in longitudinally spaced apart positions in said housing and each being adapted for sealingly engaging a full circumferential portion of the external surface of said tubular member and sealing at least portions of the longitudinal spaces between the segments of said housing upon actuation thereof;
   first and second pluralities of tapered slips mounted in said housing at longitudinally spaced apart positions and arranged for gripping said tubular member upon actuation thereof;
   hydraulic means provided in each of said segments of said housing for axially compressing and sealingly engaging said packers between said housing and said tubular member and sealing said portions of said longitudinal spaces and actuating said slips to the gripping position, each of said hydraulic means including at least one longitudinal hydraulic cylinder and a piston disposed in each of said cylinders;
   and means for providing a longitudinal seal between the adjacent surfaces of said segments of said housing in the closed position and extending between said packers.

5. The invention as claimed in claim 4 wherein:
   said first and second pluralities of slips are arranged for movement in opposite axial directions to the gripping position, whereby said slips will withstand both tension and compression forces between said housing and said tubular member.

6. The invention as claimed in claim 4 including:
   a riser pipe connected to said housing and communicating with the interior of said housing at a point intermediate said packers, for use in tapping said tubular member.

7. The invention as claimed in claim 4 including:
   mating closure pads extending from the segments of said housing which are arranged for lateral opening;
   and, a retainer pin arranged to be inserted axially through said closure pads to secure said housing about said tubular member.

8. The invention as claimed in claim 7, including:
   means for hydraulically inserting said retainer pin into said closure pads.

* * * * *